United States Patent [19]

Champ et al.

[11] Patent Number: 4,677,045
[45] Date of Patent: Jun. 30, 1987

[54] SQUARYLIUM CHARGE GENERATING DYE AND ELECTROPHOTOGRAPHIC PHOTOCONDUCTOR

[75] Inventors: Robert B. Champ; Robert L. Vollmer, both of Boulder, Colo.

[73] Assignee: International Business Machines Corporation, Armonk, N.Y.

[21] Appl. No.: 859,669

[22] Filed: May 5, 1986

Related U.S. Application Data

[63] Continuation-in-part of Ser. No. 635,013, Jul. 27, 1984, abandoned.

[51] Int. Cl.[4] .................... G03G 15/06; C07D 295/08
[52] U.S. Cl. ...................................... 430/76; 548/524; 430/58
[58] Field of Search ................ 548/523, 577, 524; 430/57, 76, 58

[56] References Cited

U.S. PATENT DOCUMENTS 3,824,099  7/1974  Champ et al. .................... 96/1.5
4,500,621  2/1985  Wurster ............................ 430/72

OTHER PUBLICATIONS

Angew. Chem. Internat. Edit., vol. 5 (1966), No. 10, "Syntheses and Derivatives of Squaric Acid", by Dr. G. Maahs and Dr. P. Hegenberg, pp. 888–893.
Angew. Chem. Internat. Ed., vol. 5, (1966), #10, pp. 893–894; "Condensation Products of Squaric Acid and Azulenic Hcbn.," Ziegenbein, et al.
Angew. Chem. Int. Ed., 5, (1966), #10, p. 894, "Condensation Products of Squaric Acid and Ttert. Aromatic Amines", Sprenger et al.

Primary Examiner—Joseph Paul Brust
Attorney, Agent, or Firm—Francis A. Sirr

[57] ABSTRACT

A squarylium dye molecule is synthesized from a phenolic precursor. The resulting hydroxy pyrrolidino squarylium (OHPYRRSQ) dye does not have to be purified in order to provide the dye with a negative response in the Ames test for mutagenicity. A xerographic photoconductor using the molecule shows superior electrophotographic performance.

7 Claims, No Drawings

SQUARYLIUM CHARGE GENERATING DYE AND ELECTROPHOTOGRAPHIC PHOTOCONDUCTOR

DESCRIPTION

Reference to Prior Application

This application is a continuation-in-part of prior application Ser. No. 06/635,013, filed July 27, 1984, now abandoned.

FIELD OF THE INVENTION

The present invention is concerned with electrophotographic photoconductors, and with the health effects of the compounds present in the photoconductor. In particular, this invention is concerned with the reproducibility and cost of the photoconductor's generating dye molecule, while at the same time ensuring that the dye molecule does not have a positive response in the Ames test for mutagenicity. In addition, a photoconductor using the dye must have superior photoconductor electrical response.

BACKGROUND OF THE INVENTION

Squaric acid methine dyes are known compounds. U.S. Pat. No. 3,824,099 describes squarylium dye molecules as photogenerating species in a xerographic photoconductor's charge generation layer. Copending and commonly assigned U.S. patent application Ser. No. 391,746, filed June 24, 1982, now abandoned, discloses purification techniques necessary to make a superior OHSQ generating molecule in this generic family of dyes, having Ames negative properties.

THE INVENTION

We have discovered a dye of the squarylium family, i.e., OHPYRRSQ, which can be used to make a superior xerographic photoconductor, is Ames negative, and yet is easy and inexpensive to produce.

The molecular formula of this new dye is

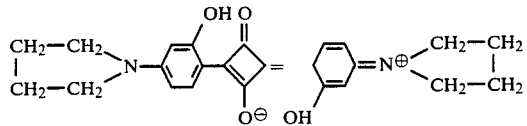

Layered electrophotographic plates of the present invention comprise a conductive substrate, the specific squarylium charge generating dye specie hydroxy pyrrolidino squarylium, or OHPYRRSQ, and a hole transport material. Electrophotographic photoconductors of this structure are extremely sensitive and have a panchromatic response which extends to 9000 Angstrom units. A particularly suitable field for their use is with printers having solid state lasers emitting in the 7500 to 8500 Angstrom range.

The health issues of electrophotographic photoconductors have always been a concern. For example, prior art photoconductors containing 2,4,7 trinitro-9-fluorenone have been shown to be positive in the Ames test for mutagenicity.

In any given generic class of photogenerating dye molecules, usually one specific dye structure is preferred, and this structure is optimized to give the best overall performance. If this structure is then found to have an environmental health problem, finding a viable substitute is not a trivial task.

It was therefore unexpected that, as we have discovered, the new dye molecule OHPYRRSQ, a member of the generic squarylium class, could be formulated in a manner to give the same electrophotographic performance as its Ames positive family member(s), and yet was routinely Ames negative, with no purification of the starting materials being required.

There are several well known electrophotographic reproduction processes in current use. They differ in their particular process steps, particularly in the sequence in which electric charging (usually with a corona) and illumination are carried out. All electrophotographic reproduction processes, however, involve the process step of selectively rendering portions of a photoconductor electrically conductive, by selective exposure to light.

The charge generating dye compound of the present invention is useful in making electrophotographic plates useful in all such processes.

It is one of the advantages of the present invention that the OHPYRRSQ generating molecule may be used with a wide variety of transport molecules, belonging to various molecule classes. Among the useful classes of transport molecules are the hydrazones, pyrazolines, fluorenones and triphenylmethanes. Alternatively the charge transport material may be an inorganic material such as selenium.

The charge generating molecule of the present invention may be used on top of the charge transport layer, beneath the charge transport layer, or may be inner mixed with the charge transport molecule to form a single layer photoconductor. For mechanical reasons, it is generally preferred that the charge transport layer be the photoconductor's top layer. When the charge generating molecule is utilized as a separate charge generating layer, this layer is generally on the order of a micron or less in thickness. The transport layer can be from 10 to 30 microns in thickness.

In forming charge generating layers of the present invention, the OHPYRRSQ squarylium dye may be used alone; however, it is preferred to use the dye in conjunction with a polymeric binder or mixture of binders. The optimum ratio of dye to binder is generally from about 0.1 to 0.9. many types of binder materials are known from the prior art. Among these are aryl sulfonamide polymers, epoxy resins, polycarbonates and polyesters.

The photoconductivity phenomenon involves at least two steps: (1) generating a charge, and (2) transporting the charge. The present invention utilizes the ability of the squarylium dye to efficiently generate electron-hole pairs upon absorption of light, thus giving rise to a latent electrostatic image, after the appropriate carriers are injected into the conductive ground plane and the transport molecule.

Among the unexpected advantages of the present invention is that this particular squarylium dye can be formulated into a generating aggregate specie.

Aggregation is generally believed to be a short range order between molecules, allowing electronic transitions to occur between these molecules, giving rise to a much broadened absorption spectrum. These aggregates occur much more easily if the molecule is locked in a planar structure. The moieties on the molecule of the present invention operate to ensure the planarity of the molecule, so that short range ordering will occur during fabrication of the photoconductor, thereby giving broad spectral response and efficient generation.

The following examples are given solely for purposes of illustration and are not to be considered limitations on the invention, many variation of which will be apparent to those of skill in this art without departing from the spirit or scope thereof.

INVENTION EXAMPLE 1

Preparation of the dye of the present invention, 2,4-di-(o-hydroxy-p-pyrrolidino phenyl) cyclobutene diylium-1,3-diolate (hydroxy pyrrolidino squarylium, or OHPYRRSQ), is as follows:

Into a one liter 3-neck flask place 360 ml. of toluene, 210 ml. of n-butanol, 29.34 grams (0.18 mole) of meta pyrrolidino phenol, and 10.26 grams (0.089 mole) of squaric acid. The flask is equipped with a reflux condenser and Dean-Stark receiver. The mixture is heated to reflux for 24 hours, allowed to cool and filtered warm. The product is washed with n-butanol, toluene and ethyl alcohol. The product is slurried at 50° C. for 10 minutes with 50/50 toluene and n-butanol, collected by filtration, washed with ethyl alcohol, and dried at 50° C. under high vacuum for four hours. The yield was 29.9 grams or 81%.

COMPARATIVE EXAMPLE 1

Ames test of the prior art dye 2,4-di-(o-hydroxy-p-dimethylamino phenyl) cyclobutene diylium-1,3-diolate was then conducted. This dye is of the type shown in Example 11 of aforesaid U.S. Pat. No. 3,824,099.

This mutagenicity testing was performed using DMSO as the solvent. Six dose levels were tested in duplicate, with and without metabolic activation, in five tester strains (TA1535, TA1537, TA1538, TA98, and TA100). The tests were repeated to ensure reproducibility.

Only those tester strains which gave result in excess of 2× over background are given below.

| Test no. | Assay no. | TA1538 x background | TA98 x background |
|---|---|---|---|
| 1 | 1 | 2.9 | 2.4 |
|   | 2 | 2.9 | 2.3 |
| 2 | 1 | 2.8 | 2.7 |
|   | 2 | 3.3 | 2.0 |

The dimethylamino phenol precursor had to be distilled and the dye had to be rigorously purified in order to obtain the above borderline positive results. If this were not done, the assay would have been highly mutagenic. For example, without purification, this prior art compound showed the following results:

| Test no. | Assay no. | TA1538 x background | TA98 x background |
|---|---|---|---|
| 1 | 1 | 4.9 | 2.6 |
|   | 2 | 6.8 | 3.3 |

INVENTION EXAMPLE 2

Ames test of the 2,4-di-(o-hydroxy-p-pyrrolidino phenyl) cyclobutene diylium-1,3-diolate (hydroxy pyrrolidino squarylium or OHPYRRSQ) of Invention Example 1 was conducted.

This compound was examined for mutagenic activity in the Ames Salmonella/microsome assay using the five standard strains of Salmonella typhimurium: TA1535, TA1537, TA1538, TA98 and TA100. All assays were performed in duplicate, both in the presence and the absence of a rat-liver metabolic activation system. DMSO was used as the solvent.

The compound was tested on two separate days at doses ranging from 10 to 5000 micrograms/plate. Low-level S-9 was used in the first assay and high-level S-9 was used in the confirming assay. Precipitate was observed at and above the 500 microgram/plate dose level, and these plates were handcounted. No mutagenic activity was seen in either assay performed.

INVENTION EXAMPLE 3

An Ames test was run on a xerographic photoconductor utilizing the compound of Invention Example 1.

The photoconductor was sonicated, at a concentration of 25 square centimeters of film per 5 milliliters of dimethylsulfoxide, for twenty minutes. The extract was then split, with half kept in the dark, and half exposed to visible light for four hours. The extracts were tested at doses ranging from 5-200 microliters per plate, with and without metabolic activation, in strains TA1538 and TA98.

These two strains were selected because they had been previously shown to be optimal for detecting the mutagens formed from the photochemical degradation of DEH, as initiated by hydroxy dimethylamino squarylium, i.e., the dye of Comparative Example 1.

No mutagenic activity was detected. This was in contrast to the results obtained with a photoconductor made from hydroxy dimethylamino squarylium and DEH, whose extracts were mutagenic under these conditions.

INVENTION EXAMPLE 4

Xerographic photoconductors were prepared from the compound of Invention Example 1. The photoconductors were made in the following manner: 0.25 grams of hydroxy pyrrolidino squarylium was dissolved in 3 milliliters of Ethylenediamine. Upon complete dissolution the resultant solution becomes straw colored. To this solution was added, with stirring, a solution of: 1.5 grams of Epon 1009, a brand of epoxy resin by Shell Oil Company; 1.0 grams of 1,1 diphenyl hydrazone-p-diethylaminobenzaldehyde (DEH) and 25 milliliters of tetrahydrofuran. The resulting pale green solution was coated onto an aluminized mylar substrate by means of a meniscus coater. The coating speeds were 2, 3, 4 and 5 feet/minute. The resultant coating was cured for 40 minutes at 100° C. This layer itself will support either a negative or positive charge, and is sensitive to actinic radiation. That is to say, by coating this layer to a thickness that would support the proper dark voltage, the result is a useable single layer photoreceptor. However, in this example the above coated layer was used as a generating layer and was overcoated with a transport layer consisting of the following: 44% by weight of Merlon M-60, a brand of polycarbonate resin by Mobay Chemical Co., 16% PE-200, a brand of polyester resin available by Goodyear Company, and 40% DEH. A solution of the above in tetrahydrofuran was coated to a dry thickness of 13.5 milligrams per square inch atop the hydroxy pyrrolidino squarylium generating layer.

The following table shows the electrical performance of these layered photoconductors:

| Coating Speed | Energy 600 to 150 volts | Dark Decay |
|---|---|---|
| 2 fpm | 1.5 microjoules/sq. cm. | 67 volts/sec |
| 3 fpm | 1.1 microjoules/sq. cm. | 89 volts/sec |
| 4 fpm | 1.2 microjoules/sq. cm. | 128 volts/sec |
| 5 fpm | 1.6 microjoules/sq. cm. | 110 volts/sec |

The spectral sensitivity of the above photoconductor which was coated at 3 fpm is tabulated below:

| Wavelength | Energy 600 to 50 volts |
|---|---|
| 500 nm | 3.4 microjoules/sq. cm. |
| 600 nm | 1.8 microjoules/sq. cm. |
| 700 nm | 1.55 microjoules/sq. cm. |
| 800 nm | 1.4 microjoules/sq. cm. |
| 850 nm | 1.3 microjoules/sq. cm. |

COMPARATIVE EXAMPLE 2

A xerographic photoconductor was prepared as in Invention Example 4, with the exception that the OHPYRRSQ dye of the present invention was replaced by 2,4-di-(p-pyrrolidino phenyl) cyclobutene diylium-1,3-diolate, i.e., a dye of the squarylium family which does not readily form an aggregate. While the reason for this dye's failure to form an aggregate is not known, it is believed that the aggregate is not formed due to the nonplanar nature of the molecule.

In this instance, upon curing of the charge generation layer very little visual optical density was noticed, and when the photoconductor was tested on a rotating disk electrometer no substantial photoconductivity was present. Thus, it was shown that this dye could not be used as a photogenerating dye in the same formulation as the dye of Invention Example 4.

This was also true with the following prior art squarylium dyes.

2,4-di-(o-methyl-p-pyrrolidino phenyl) cyclobutene diylium-1,3-diolate

This dye exhibited a monomer specie present on curing, and had no substantial photoconductivity.

2,4-di-(dihydroxyethylaminophenyl) cyclobutene diylium-1,3-diolate 2,4-di-(o-methyl-p-dimethylamino phenyl) cyclobutene diylium-1,3-diolate These dyes also exhibited a monomer specie present on curing, and had no substantial photoconductivity.

2,4-di-(o-methyl-p-dimethylamino phenyl) cyclobutene diylium-1,3-diolate

This dye exhibited only a monomer specie present on curing, and had no substantial photoconductivity.

COMPARATIVE EXAMPLE 3

A generating layer was prepared as in Invention Example 4, except that the dye used was 2,4-di-(o-hydroxy-p-diethylamino phenyl) cyclobutene diylium-1,3-diolate, whose stoichiometry is identical to that of the pyrrolidino molecule herein disclosed. Coating speed was 3 feet per minute.

Upon curing of the charge generation layer only a monomeric absorption band was noticed. The subsequent coating of the transport layer as described in Invention Example 4 produced a brilliant green film, which was then tested on the rotating disk electrometer using a tungsten-halogen light source. Very poor sensitivity was noticed, probably due to the failure of the molecule to undergo aggregation during the coating process. Subsequent testing on an 820 nm. GaAlAs laser printer gave decay from $-686$ volts to $-595$ volts with 1.5 microjoules/cm2 of energy. A photoconductor having OHPYRRSQ, and prepared and tested in the same manner, gave a voltage of $-600$ volts and decayed to a $-125$ volts with the same amount of energy.

Clearly, the diethylamino substituted squarylium dye was unsatisfactory for use as a photogenerating dye in these formulations. It is suspected that this was due to the increased solubility of this molecule, which did not allow it to undergo a transition to the aggregate state. This transition is very difficult to predict from molecular structure and is mandatory for efficient photogeneration.

COMPARATIVE EXAMPLE 4

Ames test of the prior art dye 2,4-di-(o-hydroxy-p-diethylamino phenyl) cyclobutene diylium-1,3-diolate was then conducted.

This mutagenicity testing was performed using acetone as the solvent. Six dose levels were tested in duplicate, with and without metabolic activation, in five tester strains (TA1535, TA1537, TA1538, TA98, and TA100). The tests were repeated to ensure reproducibility.

Only those tester strains which gave results in excess of 2×over background are given below.

| Test no. | Assay no. | TA1538 x background | TA98 x background |
|---|---|---|---|
| 1 | 1 | 2.6 | 2.5 |
|   | 2 | 4.0 | 1.7 |
| 2 | 1 | 2.4 | 2.0 |
|   | 2 | 3.4 | 1.5 |

The diethylamino phenol precursor had to be distilled and the dye had to be rigorously purified in order to obtain the above borderline positive results.

A FURTHER EXAMPLE

Both the prior art hydroxy dimethylamino squarylium dye of Comparative Example 1 (OHSQ) and the hydroxy pyrrolidino squarylium dye of the present invention were coated and compared for photoconductor performance. The formulations were identical, except for the generating dye molecule. Aluminized 3 mil polyester substrate was used as the conductive ground plane. This substrate was then coated with an organic barrier layer consisting of 35% Santolite MHP, a brand of aryl sulfonamide resin by Monsanto Chemical Company, and 65% Elvamide 8061, a brand of polyamide resin by E. I. DuPont. The percentages given are by weight. The dry coating thickness was about 0.01 micron. Alcohol was used as the coating solvent.

An adhesive sublayer was then coated over the barrier layer. This layer consisted of a 50/50 mixture of Santolite and PE-200, a brand of polyester resin by Goodyear Company. This layer is coated from tetrahydrofuran to a dry thickness of about 0.02 micron.

A generating layer was then coated above the barrier and adhesive layers. The dye is dissolved in the secondary amines pyrrolidine and morpholine, and then diluted with tetrahydrofuran containing Santolite. The amine/THF concentration was 16/84 by volume. The Santolite/dye ratio was 80/20 by weight. The dry coating thickness was about 0.05 micron.

A charge transport layer was then coated above the other layers. It consisted of 55% by weight polycarbonate resin M-60, a brand of this resin by Mobay, 5% PE-200, 39.25% DEH, and 0.75% Acetosol Yellow GLS, a brand of dye by Sandoz. The coating solvent was THF, and the dry coating thickness was 20 microns. An electrical comparison of the two dye molecules so coated was as follows.

Data obtained from an 820 nm GaAlAs laser printer:

| Parameter | OHSQ | OHPYRRSQ | Units |
|---|---|---|---|
| Dark Voltage | −704 | −686 | volts |
| Energy to 225 V | 0.53 | 0.42 | µj/sq. cm. |
| Residual at 1.4 µj/sq. cm. | −50 | −57 | volts |
| Dark Fatigue 2k | −50 | −65 | volts |
| Light Fatigue 2k | −43 | −36 | volts |

Data obtained from a 632.8 nm HeNe laser printer:

| Parameter | OHSQ | OHPYRRSQ | Units |
|---|---|---|---|
| Dark Voltage | −671 | −635 | volts |
| Voltage 1.1 µj/sq. cm. | −226 | −186 | volts |

Data obtained from an IBM Series III copier configuration:

| Parameter | OHSQ | OHPYRRSQ | Units |
|---|---|---|---|
| Dark Voltage | −650 | −635 | volts |
| Energy to 50 V | 1.6 | 1.6 | µj/sq. cm. |
| Dark Decay | 27 | 26 | volts/sec |

It can be seen from the above data that the two photoreceptors are very similar and both show excellent electrical performance. Thus, Ames negative OHPYRRSQ is shown to be a viable substitute for OHSQ.

While the invention has been particularly shown and described with reference to preferred embodiments thereof, it will be understood by those skilled in the art that various changes in form and details may be made therein without departing from the spirit and scope of the invention.

What is claimed is:

1. The non-mutagenic dye molecule 2,4-di-(o-hydroxy-p-pyrrolidino phenyl) cyclobutene diylium-1,3-diolate.

2. An electrophotographic photoconductor including a conductive base, and a charge transport charge generation layer means thereon containing the non-mutagenic charge generating molecule 2,4-di-(o-hydroxy-p-pyrrolidino phenyl) cyclobutene diylium-1,3-diolate.

3. A photoconductor as claimed in claim 2 wherein said layer means comprises a charge generating layer on said conductive base, said charge generating layer containing said charge generating molecule, and a charge transport layer overcoating said charge generating layer.

4. A photoconductor as claimed in claim 3 wherein said charge generating layer contains a binder.

5. A photoconductor as claimed in claim 4 wherein said charge generating layer is an aggregate.

6. A xerographic photoconductor comprising a conductive substrate, a charge generation layer containing the generating molecule 2,4-di-(o-hydroxy-p-pyrrolidino phenyl) cyclobutene diylium-1,3-diolate, and a charge transport layer.

7. A photoconductor as claimed in claim 6 wherein said charge generating molecules are in an aggregate state.

* * * * *